US012528382B1

(12) United States Patent
Ford

(10) Patent No.: US 12,528,382 B1
(45) Date of Patent: Jan. 20, 2026

(54) AUXILIARY POWER FOR TRAFFIC CONTROL SIGNALS

(71) Applicant: Chris Ford, Acton (CA)

(72) Inventor: Chris Ford, Acton (CA)

( * ) Notice: Subject to any disclaimer, the term of this patent is extended or adjusted under 35 U.S.C. 154(b) by 597 days.

(21) Appl. No.: 18/079,962

(22) Filed: Dec. 13, 2022

(51) Int. Cl.
*B60L 55/00* (2019.01)
*G08G 1/07* (2006.01)
*G08G 1/087* (2006.01)
*G08G 1/095* (2006.01)

(52) U.S. Cl.
CPC ................ *B60L 55/00* (2019.02); *G08G 1/07* (2013.01); *G08G 1/087* (2013.01); *G08G 1/095* (2013.01)

(58) Field of Classification Search
None
See application file for complete search history.

(56) References Cited

U.S. PATENT DOCUMENTS 5,659,305 A 8/1997 Rains
6,121,897 A * 9/2000 Flegel .................... G08G 1/095 340/693.2
6,965,322 B2 11/2005 Metz
7,843,361 B2 11/2010 Schnackenberg
D767,427 S 9/2016 Smith
2012/0286971 A1* 11/2012 Sekiya ..................... G08G 1/07 340/907
2019/0263289 A1* 8/2019 Ortiz ...................... G08G 1/097
2023/0327479 A1* 10/2023 Podolefsky ........... H02M 7/003

FOREIGN PATENT DOCUMENTS

CA 2474572 1/2005

* cited by examiner

*Primary Examiner* — David V Henze-Gongola

(57) ABSTRACT

Auxiliary power for traffic control signals comprises a traffic light control box, an electrical outlet, a power transfer cable, and a vehicle electrical port. The traffic light control box may control the operation of one or more traffic lights that may direct the flow of traffic. An emergency vehicle may be configured to transfer electrical power to the traffic light control box during a loss of power at the traffic light control box. The power transfer cable may be coupled between the vehicle electrical port on the emergency vehicle and the electrical outlet located within the traffic light control box. The electrical power from a vehicle electrical system may enable the traffic light control box to operate the one or more traffic lights during the loss of power.

14 Claims, 3 Drawing Sheets

AUXILIARY POWER FOR TRAFFIC CONTROL SIGNALS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of traffic control signals and auxiliary power supplies, more specifically, auxiliary power for traffic control signals.

SUMMARY OF INVENTION

Auxiliary power for traffic control signals comprises a traffic light control box, an electrical outlet, a power transfer cable, and a vehicle electrical port. The traffic light control box may control the operation of one or more traffic lights that may direct the flow of traffic. An emergency vehicle may be configured to transfer electrical power to the traffic light control box during a loss of power at the traffic light control box. The power transfer cable may be coupled between the vehicle electrical port on the emergency vehicle and the electrical outlet located within the traffic light control 24 box. The electrical power from a vehicle electrical system may enable the traffic light control box to operate the one or more traffic lights during the loss of power.

An object of the invention is to transfer electrical power from an emergency vehicle to a traffic light control box that is without power.

Another object of the invention is to provide a vehicle electrical port on the emergency vehicle, said vehicle electrical port operable to transfer electrical power out of the emergency vehicle.

A further object of the invention is to provide an outlet within the traffic light control box, said outlet operable to pass electrical power into the traffic light control box.

Yet another object of the invention is to provide a power transfer cable that is operable to plug into the vehicle electrical port on the emergency vehicle and into the outlet on the traffic light control box, said power transfer cable operable to transfer electrical power from the emergency vehicle to the traffic light control box.

These together with additional objects, features and advantages of the auxiliary power for traffic control signals will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary power for traffic control signals in detail, it is to be understood that the auxiliary power for traffic control signals is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the auxiliary power for traffic control signals.

It is therefore important that the claims be regarded as including such equivalent construction insofar as they do not depart from the spirit and scope of the auxiliary power for traffic control signals. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
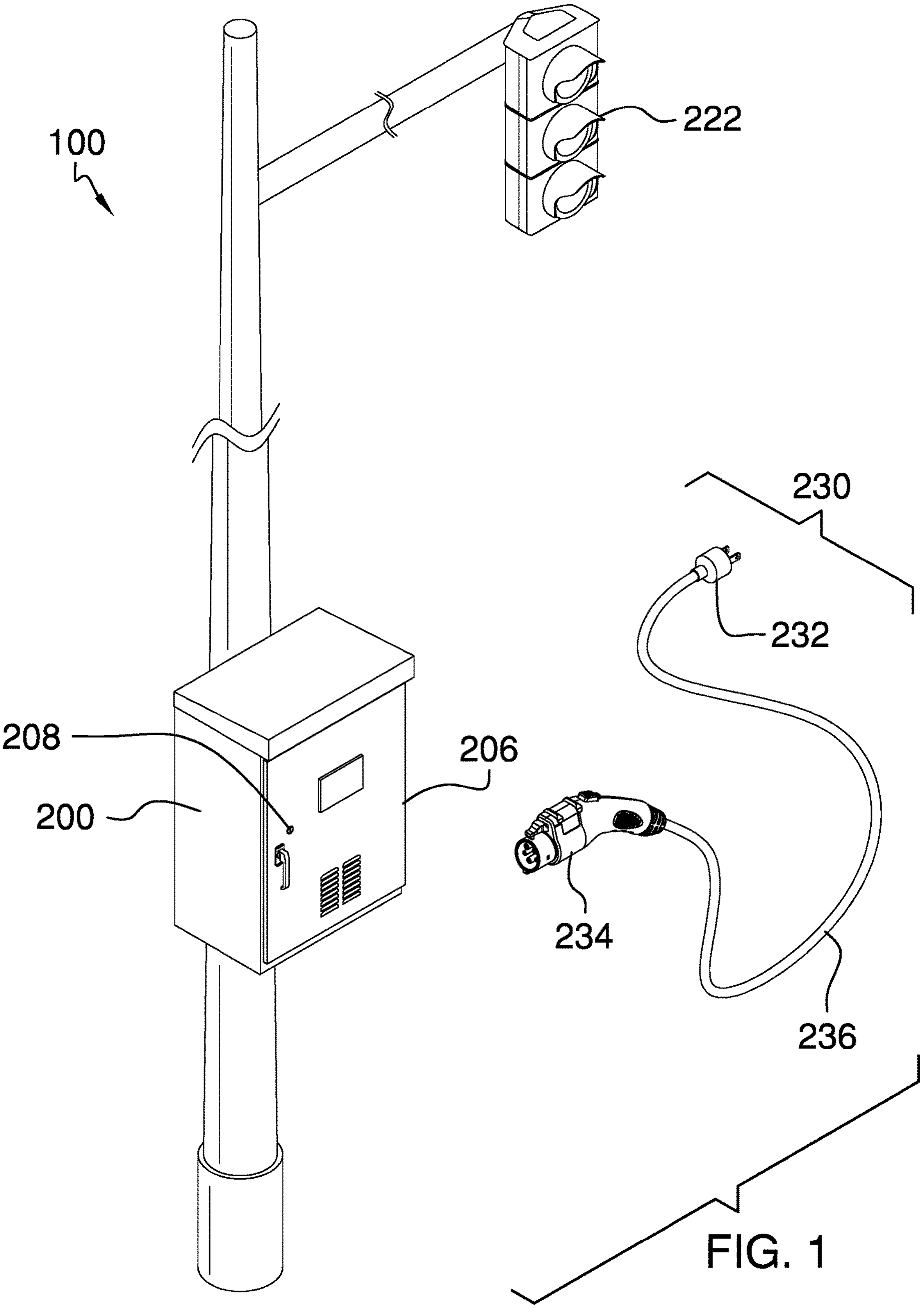
FIG. 1 is an isometric view of an embodiment of the disclosure.
Figure 2:
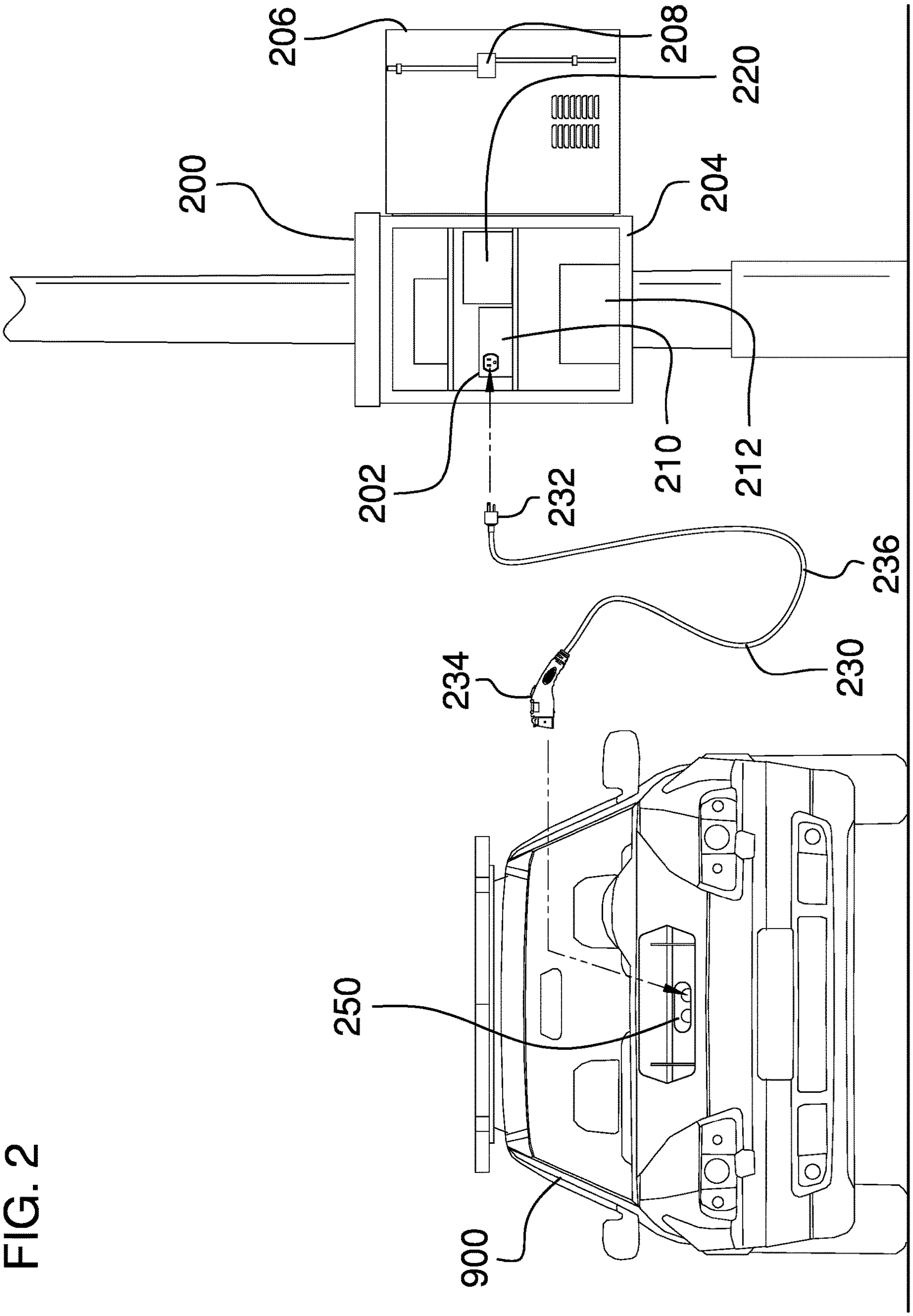
FIG. 2 is a detail view of an embodiment of the disclosure.
Figure 3:
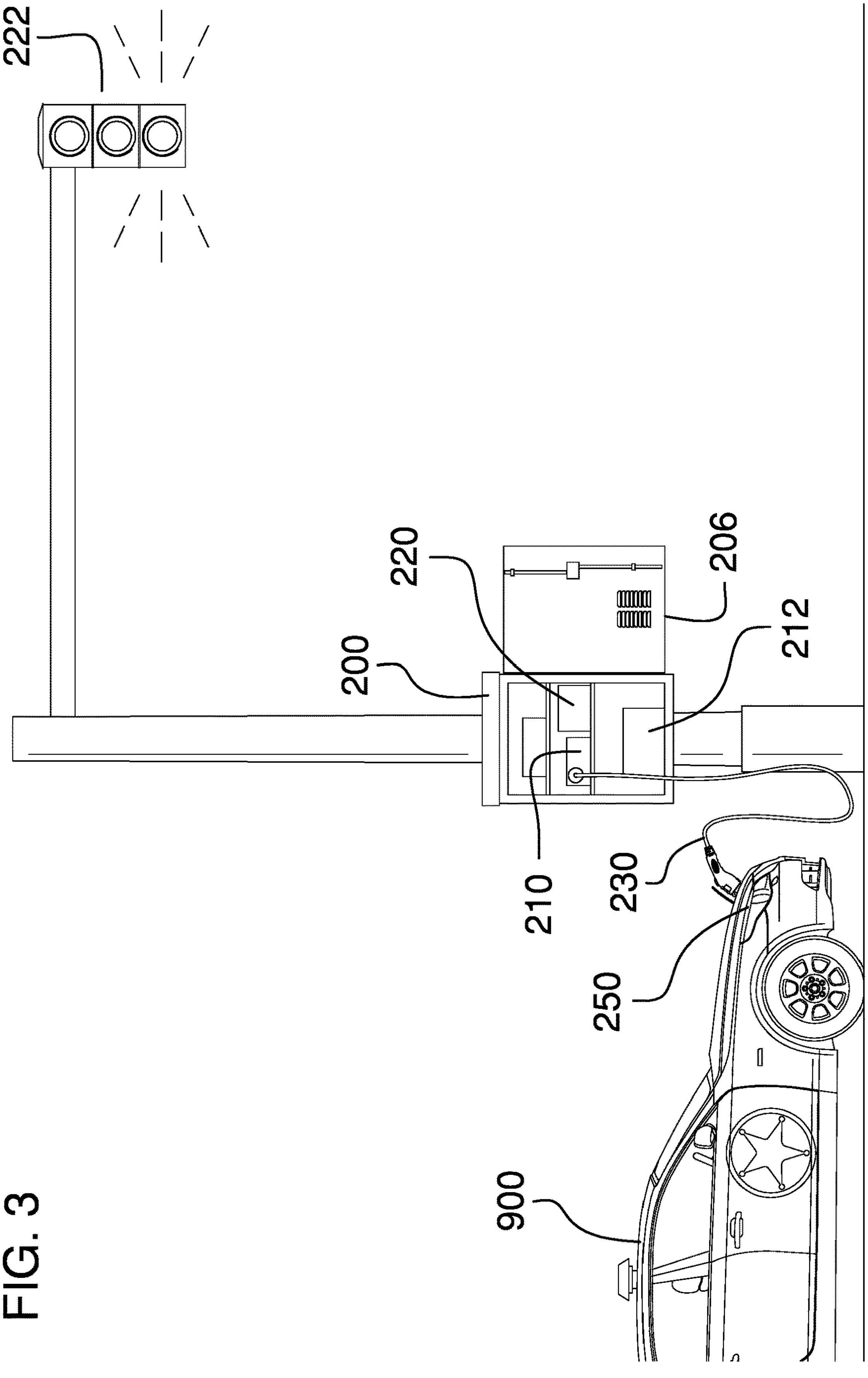
FIG. 3 is a side view of an embodiment of the disclosure.

Detailed reference will now be made to a first potential embodiment of the disclosure, which is illustrated in FIGS. 1 through 3.

Auxiliary power for traffic control signals 100 (hereinafter invention) comprises a traffic light control box 200, an electrical outlet 202, a power transfer cable 230, and a vehicle electrical port 250. The traffic light control box 200 may control the operation of one or more traffic lights 222 that may direct the flow of traffic. An emergency vehicle 900 may be configured to transfer electrical power to the traffic light control box 200 during a loss of power at the traffic light control box 200. The power transfer cable 230 may be coupled between the vehicle electrical port 250 on the emergency vehicle 900 and the electrical outlet 202 located within the traffic light control box 200. The electrical power from a vehicle electrical system may enable the traffic light control box 200 to operate the one or more traffic lights 222 during the loss of power.

The traffic light control box 200 may comprise an enclosure that houses a traffic light controller 220. The traffic light control box 200, and therefore the traffic light controller 220, may nominally be powered from an AC power source but may lose power. As non-limiting examples, the traffic light control box 200 may lose power due to a widespread power outage, storm damage to power distribution lines, a downed utility pole resulting from a vehicular accident, or other causes. The traffic light controller 220 may control the sequencing and timing of illuminating the one or more traffic lights 222. The enclosure 204 may comprise the electrical outlet 202 that may be operable to accept the electrical power supplied by an external power source that may be coupled to the electrical outlet 202.

The electrical outlet 202 may be accessible by opening an access panel 206 that may be hingedly coupled to the enclosure 204. The access panel 206 may comprise a lock 208 that may prevent unauthorized access to the traffic light control box 200. As non-limiting examples, the lock 208 may require a key, combination, fingerprint, or other biometric input in order to unlock. Emergency personnel may be provided with the key and/or combination and/or the lock 208 may be trained to recognize fingerprints or other biometric input such that the emergency personnel may open the access panel 206 of the enclosure 204.

In some embodiments, the electrical power may comprise 120 VAC, 60 Hz, at up to 15 amps. Those of ordinary skill in the art will recognize that other voltages, frequencies, currents, and/or receptacles may be used without deviating from the scope and spirit of the invention 100.

In some embodiments, the traffic light control box 200 may comprise a traffic control power circuit 210 that may receive the electrical power at the electrical outlet 202 and may condition the electrical power for use within the traffic light control box 200. As non-limiting examples, the traffic control power circuit 210 may change alternating current to direct current or vice versa, may change the voltage and/or current of the electrical power, may change the frequency and/or phase of the electrical power, or any combination thereof. The traffic control power circuit 210 may operate the one or more traffic lights 222 from the electrical power, may recharge one or more backup batteries 212, or both.

The power transfer cable 230 may transfer the electrical power from the vehicle electrical port 250 on the emergency vehicle 900 to the electrical outlet 202 on the traffic light control box 200. The power transfer cable 230 may comprise a vehicle plug 234, a controller plug 232 and a plurality of conductors 236 that may electrically couple the vehicle plug 234 to the controller plug 232. The plurality of conductors 236 may comprise a single electrical cable.

The vehicle plug 234 may be an electrical connector that may detachably couple to the vehicle electrical port 250 on the emergency vehicle 900 to transfer the electrical power provided through the vehicle electrical port 250 to the controller plug via the plurality of conductors 236. In some embodiments, the vehicle plug 234 may be an SAE J1772 plug.

The controller plug 232 may be an electrical connector that may detachably couple to the electrical outlet 202 on the traffic light control box 200 and receive the electrical power from the emergency vehicle 900 via the plurality of conductors 236. The controller plug 232 may transfer the electrical power through the electrical outlet 202 into the traffic light control box 200. In some embodiments, the controller plug 232 may be a NEMA 5-15P plug and the electrical outlet 202 may be a NEMA 5-15R receptacle.

The emergency vehicle 900 may comprise the vehicle electrical port 250 which may be an electrical connector through which the emergency vehicle 900 may provide the electrical power to the traffic light control box 200. The vehicle electrical port 250 may be accessible from the exterior of the emergency vehicle 900 either directly or after opening an access panel on the emergency vehicle 900.

In some embodiments, the emergency vehicle 900 may comprise a vehicle power controller that may condition and limit the electrical power transferred out of the emergency vehicle 900. As a non-limiting example, the vehicle power controller may comprise a DC to AC inverter that may convert a DC voltage available from the vehicle electrical system into an AC voltage that may be transferred to the traffic light control box 200. As a non-limiting example, the vehicle electrical system may provide the DC voltage from one or more vehicle batteries.

In some embodiments, the vehicle electrical port 250 may also be operable to charge the emergency vehicle 900 which may be an electric vehicle. As non-limiting examples, the vehicle power controller may autosense the voltage, current, polarity, frequency, phase, or any combination thereof to determine the direction of the electrical power—the emergency vehicle 900 to the traffic light control box 200 of the traffic light control box 200 to the emergency vehicle 900.

In use, an emergency vehicle 900, which may also be an electric vehicle, may arrive at the traffic light control box 200 that has lost power due to a widespread power outage, storm damage to power distribution lines, a downed utility pole resulting from a vehicular accident, or some other cause. The emergency vehicle 900 may park adjacent to the traffic light control box 200 and emergency personnel may couple a power transfer cable 230 between the emergency vehicle 900 and the traffic light control box 200 to transfer electrical power from the emergency vehicle 900 to the traffic light control box 200. The electrical power from the emergency vehicle 900 may enable the traffic light control box 200 to illuminate and operate one or more traffic lights 222. To transfer the electrical power, the emergency personnel may open an access panel 206 on the traffic light control box 200 to expose an electrical outlet 202. The emergency personnel may plug the controller plug 232 end of the power transfer cable 230 into the electrical outlet 202 and the vehicle plug 234 end of the power transfer cable 230 into a vehicle electrical port 250 on the emergency vehicle 900.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

As used herein, “110 VAC”, “115 VAC”, and “120 VAC” may refer to the household power standard in North America also known as “mains electric power”, “utility power”, “household 11 power”, “house current”, “house current”, “powerline”, “domestic power”, “wall power”, “line power”, “AC power”, “city power”, and “street power”. Even though it may be called as 110 VAC for historical reasons, national standards in the U.S. and Canada specify a voltage of 120 VAC. Single phase electrical power at a voltage of 120 VAC RMS (+/−5%) 60 Hz may be available at outlets within a building. The electrical service into the building may provide a first hot wire of 120 VAC, a second hot wire of 120 VAC, and a neutral wire. Some devices may operate off of 120 VAC by connecting between the first hot wire and neutral, some devices may operate off of 120 VAC by connecting between the second hot wire and neutral and some devices may operate off of 240 VAC by connecting between the first hot wire and the second hot wire.

As used in this disclosure, "AC" may be an acronym for alternating current.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "cable" may be a collection of insulated wires covered by a protective casing that is used for transmitting electricity or telecommunication signals.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used in this disclosure, "DC" may be an acronym for direct current.

As used in this disclosure, the word "exterior" may be used as a relational term that implies that an object is not located or contained within the boundary of a structure or a space.

As used in this disclosure, "frequency" may be a count of the number of repetitions of a cyclic process has been completed within a set period of time.

As used in this disclosure, a "lock" may refer to a fastening device that prevents the movement or operation of another device. As non-limiting examples, a lock may be released through the use of a key, a numeric or alphanumeric combination, or a biometric identification protocol.

As used herein, "NEMA" or the "National Electrical Manufacturers Association" may refer to a trade association of electrical equipment manufacturers in the United States. NEMA publishes standards including major standards for electrical enclosures, motors and magnet wire, AC plugs and receptacles. The NEMA connectors are universal in North America and also used by some other countries.

As used in this disclosure, a "plug" may be an electrical termination that electrically connects a first electrical circuit to a second electrical circuit or a source of electricity.

As used in this disclosure, "SAE" may be an acronym that stands for an organization called the Society of Automotive Engineers. Among other activities, the SAE defines standard tool sizes that are measured as fractions of an inch.

As used herein, "traffic signal" (also known as a "traffic light" or "stop light") refers to an illuminated traffic control that may direct the flow of traffic through an intersection or on a road. The position, color, and flashing state of each light may be significant. As non-limiting examples, red may indicate "stop", amber may indicate "caution", green may indicate "proceed if safe to do so", and flashing may indicate "attention", "temporarily out of service", or "stop then proceed with caution". One of the most commonly known traffic signals comprises vertically stacked red, amber, and green lights that cycle to alternate the right of way at an intersection. Non-limiting examples of other configuration of traffic signals include those with additional lights to signal turns, those with split stackings corresponding to more than one lanes of traffic, and those with only a single light such as those found in front of fire stations or at crosswalks.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. Auxiliary power system for traffic control signals comprising:

a traffic light control box, an electrical outlet, a power transfer cable, and a vehicle electrical port;

wherein the traffic light control box controls the operation of one or more traffic lights that direct the flow of traffic;

wherein an emergency vehicle is configured to transfer electrical power to the traffic light control box during a loss of power at the traffic light control box;

wherein the power transfer cable is coupled between the vehicle electrical port on the emergency vehicle and the electrical outlet located within the traffic light control box;

wherein the electrical power from a vehicle electrical system enables the traffic light control box to operate the one or more traffic lights during the loss of power;

wherein the traffic light control box comprises a traffic control power circuit that receives the electrical power at the electrical outlet and conditions the electrical power for use within the traffic light control box;

wherein the traffic control power circuit operates the one or more traffic lights using the electrical power, recharges one or more backup batteries, or both;

wherein the one or more backup batteries are located in the traffic control light box;

wherein the power transfer cable transfers the electrical power from the vehicle electrical port on the emergency vehicle to the electrical outlet on the traffic light control box;

wherein the power transfer cable comprises a vehicle plug, a controller plug and a plurality of conductors that electrically couple the vehicle plug to the controller plug;

wherein the vehicle plug is an electrical connector that detachably couples to the vehicle electrical port on the emergency vehicle to transfer the electrical power provided through the vehicle electrical port to the controller plug via the plurality of conductors;

wherein the emergency vehicle comprises a vehicle power controller that conditions and limits the electrical power transferred out of the emergency vehicle;

wherein the vehicle electrical port is operable to charge the emergency vehicle which is an electric vehicle.

2. The auxiliary power system for traffic control signals according to claim 1 wherein the traffic light control box comprises an enclosure that houses a traffic light controller;

wherein the traffic light controller controls the sequencing and timing of illuminating the one or more traffic lights;

wherein the enclosure comprises the electrical outlet that is operable to accept the electrical power supplied by an external power source that is coupled to the electrical outlet.

3. The auxiliary power system for traffic control signals according to claim 2 wherein the electrical outlet is accessible by opening an access panel that is hingedly coupled to the enclosure.

4. The auxiliary power system for traffic control signals according to claim 3 wherein the access panel comprises a lock that prevents unauthorized access to the traffic light control box.

5. The auxiliary power system for traffic control signals according to claim 4 wherein the lock requires a key, combination, fingerprint, or other biometric input in order to unlock.

6. The auxiliary power system for traffic control signals according to claim 4 wherein the electrical power comprises 120 VAC, 60 Hz, at up to 15 amps.

7. The auxiliary power system for traffic control signals according to claim 4 wherein the traffic control power circuit changes alternating current to direct current or vice versa, changes the voltage and/or current of the electrical power, changes the frequency and/or phase of the electrical power, or any combination thereof.

8. The auxiliary power system for traffic control signals according to claim 7 wherein the vehicle plug is an SAE J1772 plug.

9. The auxiliary power system for traffic control signals according to claim 7 wherein the controller plug is an electrical connector that detachably couples to the electrical outlet on the traffic light control box and receive the electrical power from the emergency vehicle via the plurality of conductors;

wherein the controller plug transfers the electrical power through the electrical outlet into the traffic light control box.

10. The auxiliary power system for traffic control signals according to claim 9 wherein the controller plug is a NEMA 5-15P plug and the electrical outlet is a NEMA 5-15R receptacle.

11. The auxiliary power system for traffic control signals according to claim 9 wherein the emergency vehicle comprises the vehicle electrical port which is an electrical connector through which the emergency vehicle provides the electrical power to the traffic light control box.

12. The auxiliary power system for traffic control signals according to claim 11 wherein the vehicle power controller comprises a DC to AC inverter that converts a DC voltage available from the vehicle electrical system into an AC voltage that is transferred to the traffic light control box.

13. The auxiliary power system for traffic control signals according to claim 12 wherein the vehicle electrical system provides the DC voltage from one or more vehicle batteries.

14. The auxiliary power system for traffic control signals according to claim 13 wherein the vehicle power controller autosenses the voltage, current, polarity, frequency, phase, or any combination thereof to determine the direction of the electrical power—the emergency vehicle to the traffic light control box or the traffic light control box to the emergency vehicle.

* * * * *